United States Patent [19]
Whitehead et al.

[11] 3,808,023
[45] Apr. 30, 1974

[54] PIGMENTARY TiO₂
[75] Inventors: Jack Whitehead; Coulson Lloyd Denton, both of Teesside, England
[73] Assignee: British Titan Limited, Billingham, England
[22] Filed: Apr. 17, 1973
[21] Appl. No.: 351,974

[30] Foreign Application Priority Data
June 27, 1972  Great Britain.................... 29945/72

[52] U.S. Cl........... 106/300, 106/308 O, 106/308 N
[51] Int. Cl.............................................. C09c 1/36
[58] Field of Search............ 106/308 O, 308 N, 300

[56] References Cited
UNITED STATES PATENTS
2,737,460  3/1956  Werner............................. 106/300
3,520,710  7/1970  Kniffin et al..................... 106/308 N
3,723,149  3/1973  Francis et al..................... 106/308 N
3,412,944  11/1968  Wollenberg et al............... 106/300

Primary Examiner—Delbert E. Gantz
Assistant Examiner—Juanita M. Nelson
Attorney, Agent, or Firm—Schuyler, Birch, Swindler, McKie & Beckett

[57] ABSTRACT

Aqueous slurries of pigmentary TiO₂ which are rendered resistant to changes in viscosity owing to the presence of Group II metal ions by the addition of monoethanolamine. The monoethanolamine may be applied to the particles before forming the slurry or it may be added to the aqueous slurry after formation.

12 Claims, No Drawings

PIGMENTARY TIO

The present invention relates to a process for avoiding or reducing increases in the viscosity of aqueous slurries of $TiO_2$ in the presence of ions of Group II elements, particularly calcium and, to a lesser extent magnesium ions. The invention also includes treated $TiO_2$, aqueous slurries thereof and products such as paper produced by the use of such pigment and/or slurries.

We have found that aqueous slurries containing pigmentary $TiO_2$, for example uncoated $TiO_2$ of the anatase or rutile form, suffer an increase in viscosity in the presence of ions of the elements of Group II of the Periodic Table. The problem is particularly serious where the ions are calcium ions and, to a lesser extent magnesium ions. Such an increase in viscosity is most undesirable since it causes problems in the handling and subsequent use of the aqueous slurry.

The ions may be derived from any source but the main problem arises from the use of hard water (containing calcium and/or magnesium ions) and, particularly in paper coating, from the use of composite pigments of $TiO_2$ and calcium carbonate and/or China clay. Even though the solubility of ions of Group II elements, and particularly of calcium and magnesium ions is low, the solubility is normally sufficient to provide the undesired decrease in viscosity.

In the application of $TiO_2$ to paper, the $TiO_2$ is normally uncoated, dry milled anatase $TiO_2$ (although coated anatase $TiO_2$ and uncoated and coated rutile $TiO_2$ are also used) and it may be applied as an aqueous slurry to the cellulose or other fibres or the slurry may be applied to the preformed sheet as a thin film, for example by means of a roller, a blade or by an air knife and it is in this operation that increases in viscosity cause the greatest problems. Even though the viscosity of the initial aqueous slurry may be satisfactory, increased viscosities may develop as the aqueous slurry is recirculated, as it is in a continuous coating process for example. The application of increased temperature and/or increased shear conditions may also contribute to the problem.

Binders, for example modified starches, proteinaceous materials such as casein, and synthetic polymers for example of the latex type, are commonly added to the aqueous slurries of $TiO_2$ and whereas these may assist in reducing any increase in viscosity they do not normally solve the problem.

It is an object of the present invention to provide $TiO_2$ pigments for use in aqueous slurries and aqueous slurries thereof wherein an increase in viscosity in the slurry is reduced or prevented.

Accordingly, the present invention comprises pigmentary titanium dioxide particles coated with monoethanolamine.

The invention also comprises an aqueous slurry of pigmentary titanium dioxide containing monoethanolamine.

The pigmentary titanium dioxide may be either of the rutile or anatase modification and it may be uncoated or coated with metal and/or metalloid oxides prior to the application of the monoethanolamine. It is preferred, however, that it is uncoated pigmentary anatase titanium dioxide, for example uncoated dry milled pigmentary anatase titanium dioxide, since it is with such material that the greatest problems of increase of viscosity in aqueous slurries in the presence of Group II ions are encountered and, furthermore, such materials are probably the most commonly used $TiO_2$ pigments in paper manufacture.

The monoethanolamine may be applied to the pigment by any suitable method, for example it may be introduced (either undiluted or in a solvent) into an aqueous slurry of the titanium dioxide pigment which may then, if desired, be dried and/or milled or it may be introduced into a fluid energy mill in which the pigment is being milled, for example by superheated steam, or it may be added at the dry milling stage of the pigment, again either undiluted or in a solvent, for example in the case of uncoated anatase titanium dioxide. Spray drying may be used to dry the pigment after the addition of monoethanolamine, if desired.

After the application of the monoethanolamine the titanium dioxide pigment may, if not already in the form of an aqueous slurry, be formed into such a slurry for transport and/or for subsequent use, for example in the pigmentation of paper.

As an alternative to coating the pigmentary titanium dioxide with monoethanolamine, it is possible that monoethanolamine could be added, normally with vigorous agitation, to a preexisting aqueous slurry of the titanium dioxide. This method is not, however, preferred since the reaction is slower and because of this a higher proportion of monoethanolamine to titanium dioxide is required to obtain a similar effect.

Amounts of monoethanolamine applied as a coating where the pigment is subsequently dried are normally up to 10 percent and preferably in the range 0.1 percent to 2 percent by weight of $TiO_2$ (on the dry $TiO_2$ pigment).

Where the monoethanolamine is added to a preexisting aqueous slurry of $TiO_2$ then quantities of monoethanolamine of up to 10 percent and preferably up to about 3 percent by weight would normally be used but, as noted previously, larger amounts are required than when the monoethanolamine is applied as a coating.

It has surprisingly been found that monoethanolamine is much more effective in reducing or inhibiting an increase in the viscosity of aqueous slurries of $TiO_2$ pigment than are either tri- or di-ethanolamine (hereinafter referred to as TEA and DEA respectively) and, in particular, the action of monoethanolamine (MEA) is much more prolonged than is that of the other two ethanolamines mentioned. This is clearly demonstrated in TABLE 1 of the Examples. The marked tendency of aqueous slurries of $TiO_2$ in the presence of the calcium carbonate and in the absence of an ethanolamine to change in viscosity is also clearly demonstrated.

By the term uncoated $TiO_2$ particles is meant $TiO_2$ particles of either the anatase or rutile modification free from a coating of any metal or metalloid oxide such as alumina, silica and/or titania, or any coating of an organic material, such as an alcohol, an organic amine or a polyalkylene glycol.

Where coated $TiO_2$ particles are referred to in this specification these are pigmentary $TiO_2$ particles coated with metal and/or metalloid oxides such as alumina, silica, titania, zirconia, ceria and/or tin oxides, or with phosphates of such metals, for example with aluminium phosphate. $TiO_2$ particles coated with organic compounds, for example those referred to above, are, however, not suitable for use with the present invention and are not included in the term coated $TiO_2$ particles.

Where metal and/or metalloid oxides are precipitated on to the $TiO_2$ particles, amounts in the range of about 0.2% to 10 percent by weight on $TiO_2$ are normally deposited and preferably amounts in the range 0.5 percent to 5 percent for the metal oxides and from 0.5 percent to 10 percent for silica are used. Such coatings are usually applied by a wet coating process in which the $TiO_2$ particles are formed into an aqueous suspension to which is added a hydrolysable compound of the metal and/or metalloid and the pH value of the resulting mixture is adjusted to precipitate on the particles the hydrous oxide of the metal or metalloid element. The coated particles are then recovered, dried and milled before use.

The following Examples show the results obtained from embodiments of the present invention when compared with results obtained by processes not in accordance with the invention.

EXAMPLE 1

A dry milled uncoated anatase titanium dioxide pigment was taken and divided into four parts. One part was not coated, and the other three parts were coated, respectively with (a) 0.32 percent triethanolamine, (b) 0.32 percent diethanolamine and (c) 0.32 percent monoethanolamine. The proportions were by weight on $TiO_2$ and the coated procedure was the same in all cases. All pigments were then formed separately into 70 percent aqueous slurries and to each slurry was added sufficient calcium carbonate to provide a 1 percent concentration. The viscosities of the slurries were measured at the times shown and the results are given in Table 1 below:

TABLE 1

| | Viscosities (in poises) | | | |
|---|---|---|---|---|
| | No. ethanolamine | 0.32% TEA | 0.32% DEA | 0.32% MEA |
| 0 mins. | 0.43 | 0.75 | 0.75 | 0.75 |
| 45 mins. | Solid | 1.12 | 0.84 | |
| 105 mins. | | 1.87 | 0.84 | 0.93 |
| 135 mins. | | Solid | 2.60 | |
| 150 mins. | | | >18.6 | |
| 180 mins. | | | Solid | 1.50 |
| 240 mins. | | | | 1.50 |
| 5 hours | | | | 1.87 |
| 6 hours | | | | 2.50 |
| 8 hours | | | | 3.36 |
| 9 hours | | | | Solid |

EXAMPLE 2

Pigmentary anatase $TiO_2$ particles coated with alumina and silica in amounts of 2 percent and 0.7 percent by weight on $TiO_2$ respectively and with 0.32 percent monoethanolamine (MEA) were formed into an aqueous slurry containing 60 percent $TiO_2$ particles and 1 percent calcium carbonate by weight on $TiO_2$. At the same time a similar slurry was formed from similar pigmentary $TiO_2$ particles (i.e. containing 60 percent of an anatase $TiO_2$ coated with 2 percent alumina and 0.7 percent silica) but without a coating of monoethanolamine.

The slurries were allowed to stand for a prolonged period and the viscosities of the slurries were measured at intervals. The results obtained are shown in table 2.

TABLE 2

| Hours | Untreated | + 1% $CaCO_3$ +0.32% MEA |
|---|---|---|
| | Poises | |
| 0 | 20 | 0.4 |
| 1 | 20 | 0.5 |
| 17 | 54 | 0.8 |
| 20 | 54 | 0.8 |
| 24 | 54 | 0.8 |
| 41 | | 0.8 |
| 48 | | 0.8 |
| 65 | | 1.2 |
| 89 | | 1.2 |
| 161 | | 3.0 |

EXAMPLE 3

The process of Example 2 was repeated using pigmentary rutile $TiO_2$ coated only with 0.32 percent monoethanolamine as a 45 percent aqueous slurry and its viscosity over a period was compared with that of a 45 percent aqueous slurry of uncoated rutile $TiO_2$ i.e. free from monoethanolamine.

The results obtained are given in Table 3.

TABLE 3

| Hours | Untreated | + 1% $CaCO_3$ +0.32% MEA |
|---|---|---|
| | Poises | |
| 0 | 15 | 5 |
| 1 | 15 | 5 |
| 17 | 22 | 5 |
| 20 | 22 | 5 |
| 24 | 30 | 7 |
| 41 | 30 | 7 |
| 48 | 30 | 7 |
| 65 | 30 | 7 |
| 89 | 30 | 7 |
| 161 | 33 | 8 |

EXAMPLE 4

The processes of Examples 2 and 3 were repeated comparing the viscosities of a 60 percent aqueous slurry of a rutile $TiO_2$ coated with 4.5 percent alumina, 9.5 percent silica and 0.32 percent monoethanolamine and a similar slurry of the pigment without the coating of monoethanolamine.

The results obtained are given in Table 4.

TABLE 4

| Hours | Untreated | + 1% $CaCO_3$ +0.32% MEA |
|---|---|---|
| | Poises | |
| 0 | 4 | 1.4 |
| 1 | 4 | 1.4 |
| 17 | 5 | 1.4 |
| 20 | 5 | 1.4 |
| 24 | 5 | 1.4 |
| 41 | 5 | 1.4 |
| 48 | 5 | 1.4 |
| 65 | 5 | 1.4 |
| 89 | 5 | 1.4 |
| 161 | 5 | 1.4 |

What is claimed is:

1. An aqueous slurry of pigmentary titanium dioxide particles containing monoethanolamine.

2. An aqueous slurry of pigmentary titanium dioxide as claimed in claim 1 containing not more than 3 percent by weight of monoethanolamine.

3. An aqueous slurry of pigmentary titanium dioxide particles as claimed in claim 1 wherein monoethanolamine is applied to the pigmentary titanium dioxide particles before slurrying the particles in water.

4. An aqueous slurry of pigmentary titanium dioxide particles as claimed in claim 3 wherein monoethanolamine is applied to uncoated anatase titanium dioxide particles.

5. An aqueous slurry of pigmentary titanium dioxide particles as claimed in claim 3 wherein monoethanolamine is applied to coated anatase or rutile titanium dioxide.

6. An aqueous slurry of pigmentary titanium dioxide particles as claimed in claim 3 wherein from 0.1 percent to 2 percent of monoethanolamine, by weight on $TiO_2$, is retained on the particles.

7. An aqueous slurry of pigmentary titanium dioxide particles as claimed in claim 1 wherein the titanium dioxide particles are coated with from 0.2 percent to 10 percent by weight on $TiO_2$ of a compound comprising an oxide or a phosphate of a metal or metalloid component said metal being selected from the group consisting of alumina, silica, titania, zirconia, ceria and tin.

8. An aqueous slurry of pigmentary titanium dioxide particles as claimed in claim 7 wherein the particles are coated with from 0.5 percent to 5 percent of at least one metal oxide and with from 0.2 percent to 10 percent of silica.

9. Pigmentary titanium dioxide particles coated with monoethanolamine.

10. Pigmentary titanium dioxide particles as claimed in claim 9 wherein the monoethanolamine is applied to uncoated anatase titanium dioxide particles.

11. Pigmentary titanium dioxide particles as claimed in claim 9 wherein the monoethanolamine is applied to coated anatase or rutile titanium dioxide particles.

12. Pigmentary titanium dioxide particles as claimed in claim 9 wherein the particles are coated with from 0.1 to 2 percent of monoethanolamine.

* * * * *